(12) United States Patent
Yamada et al.

(10) Patent No.: US 9,197,367 B2
(45) Date of Patent: *Nov. 24, 2015

(54) UPLINK CONTROL INFORMATION MULTIPLEXING ON THE PHYSICAL UPLINK CONTROL CHANNEL FOR LTE-A

(71) Applicant: Sharp Kabushiki Kaisha, Osaka-si, Osaka (JP)

(72) Inventors: Shohei Yamada, Vancouver, WA (US); Zhanping Yin, Vacouver, WA (US); Sayantan Choudhury, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,941

(22) Filed: Jan. 17, 2014

(65) Prior Publication Data

US 2014/0133439 A1    May 15, 2014

Related U.S. Application Data

(63) Continuation of application No. 12/896,859, filed on Oct. 2, 2010, now Pat. No. 8,670,379.

(51) Int. Cl.
*H04Q 7/00* (2006.01)
*H04L 1/00* (2006.01)
(Continued)

(52) U.S. Cl.
CPC ............ *H04L 1/0058* (2013.01); *H04L 1/0026* (2013.01); *H04L 1/0073* (2013.01); *H04L 1/1671* (2013.01); *H04W 28/046* (2013.01); *H04W 72/0413* (2013.01); *H04L 1/0031* (2013.01); *H04L 1/0057* (2013.01); *H04L 1/08* (2013.01); *H04L 1/1812* (2013.01); *H04L 2001/125* (2013.01)

(58) Field of Classification Search
CPC ........... H04W 72/0413; H04W 28/046; H04L 1/0058; H04L 1/1671; H04L 1/0073; H04L 1/0026
USPC ......... 370/252, 328, 329, 335, 330, 280, 281; 375/259, 260

See application file for complete search history.

(56) References Cited

U.S. PATENT DOCUMENTS 8,670,379 B2 * 3/2014 Yamada et al. ............... 370/328
2009/0196247 A1   8/2009 Fan et al.
(Continued)

FOREIGN PATENT DOCUMENTS

WO   2009/100069   8/2009
WO   2010/048142   4/2010

OTHER PUBLICATIONS

U.S. Appl. No. 61/331,820, filed May 5, 2010.*
(Continued)

*Primary Examiner* — Chuong T Ho
(74) *Attorney, Agent, or Firm* — Austin Rapp & Hardman

(57) ABSTRACT

A method for reporting uplink control information (UCI) on a user equipment (UE) is described. The UCI is coded using a first block coder and a second block coder to obtain an output bit sequence. The output bit sequence is scrambled to obtain a scrambled signal. A block of complex-valued modulation symbols is generated from the scrambled signal for physical uplink control channel (PUCCH) Format 3. The first block coder and the second block coder use a Reed-Muller code.

4 Claims, 12 Drawing Sheets

(51) Int. Cl.
*H04L 1/16* (2006.01)
*H04W 28/04* (2009.01)
*H04W 72/04* (2009.01)
*H04L 1/08* (2006.01)
*H04L 1/18* (2006.01)
*H04L 1/12* (2006.01)

(56) References Cited

U.S. PATENT DOCUMENTS

| | | | |
|---|---|---|---|
| 2010/0098012 A1 | 4/2010 | Bala et al. | |
| 2010/0103860 A1 | 4/2010 | Kim et al. | |
| 2010/0165931 A1 | 7/2010 | Nimbalker et al. | |
| 2010/0195575 A1 | 8/2010 | Papasakellariou et al. | |
| 2011/0228863 A1 | 9/2011 | Papasakellariou et al. | |
| 2011/0243066 A1* | 10/2011 | Nayeb Nazar et al. | 370/328 |
| 2011/0249578 A1* | 10/2011 | Nayeb Nazar et al. | 370/252 |
| 2011/0268080 A1 | 11/2011 | Luo et al. | |
| 2011/0274059 A1* | 11/2011 | Brown et al. | 370/329 |
| 2011/0310823 A1 | 12/2011 | Nam et al. | |
| 2011/0310853 A1 | 12/2011 | Yin et al. | |
| 2011/0317778 A1 | 12/2011 | Hooli et al. | |
| 2012/0051245 A1* | 3/2012 | Nam et al. | 370/252 |
| 2012/0076028 A1 | 3/2012 | Ko et al. | |
| 2014/0078942 A1* | 3/2014 | Noh et al. | 370/280 |
| 2014/0376424 A1* | 12/2014 | Seo et al. | 370/280 |

OTHER PUBLICATIONS

3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.

3GPP TS 36.331 V9.1.0, "Evolved Universal Terrestrial Radio Access (E-UTRA) Radio Resource Control (RRC); Protocol specification (Release 9)," Dec. 2009.

3GPP TS 36.214 V8.6.0, "Evolved Universal Terrestrial Radio Access (E-UTRA) Physical layer—Measurements (Release 8)," Mar. 2009.

3GPP TS 36.213 V8.6.0, "Evolved Universal Terrestrial Radio Access (E-UTRA) Physical layer procedures (Release 8)," Mar. 2009.

3GPP TS 36.212 V9.0.0, "Evolved Universal Terrestrial Radio Access (E-UTRA); Multiplexing and Channel Coding (Release 9)," Dec. 2009.

3GPP TS 36.211 V9.0.0, "Evolved Universal Terrestrial Radio Access (E-UTRA); Physical Channels and Modulation (Release 9)," Dec. 2009.

Panasonic, "Periodic CQI/PMI/RI Reporting for Carrier Aggregation," 3GPP TSG-RAN WG1 Meeting 62, R1-104887, Aug. 2010.

ZTE, "Details for A/N Transmission Based on DFT-s-OFDM," 3GPP TSG RAN WG1 Meeting #62, R1-104671, Aug. 2010.

International Search Report issued for International Patent Application No. PCT/JP2011/071538 on Nov. 8, 2011.

U.S. Appl. No. 61/389,057, filed Oct. 1, 2010.

Office Action issued for U.S. Appl. No. 12/896,859 on Jun. 4, 2012.

Office Action issued for U.S. Appl. No. 12/896,859 on Nov. 7, 2012.

Advisory Action issued for U.S. Appl. No. 12/896,859 on Feb. 21, 2013.

Notice of Allowance issued for U.S. Appl. No. 12/896,859 on Oct. 25, 2013.

Texas Instruments, "Separate Rank and CQI Feedback in PUCCH", 3GPP TSG RAN WG1 Meeting #52, R1-080708, Feb. 2008.

Extended European Search Report issued for European Patent Application No. 11828903.2 on Oct. 29, 2014.

* cited by examiner

US 9,197,367 B2

UPLINK CONTROL INFORMATION MULTIPLEXING ON THE PHYSICAL UPLINK CONTROL CHANNEL FOR LTE-A

CROSS-REFERENCE TO RELATED APPLICATION

This application is a continuation of U.S. patent application Ser. No. 12/896,859, filed Oct. 2, 2010, and now issued as U.S. Pat. No. 8,670,379.

TECHNICAL FIELD

The present invention relates generally to wireless communications and wireless communications-related technology. More specifically, the present invention relates to systems and methods for uplink control information multiplexing on the physical uplink control channel for LTE-A.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. One such technique may include using multiple antennas for multiple-input and multiple-output (MIMO) or transmit diversity (TxD). Additional gains may be realized within these channels. Benefits may be realized by providing gains within these control channels while maintaining or increasing reliability and sustaining compatibility with older equipment. Therefore, benefits may be realized by improved encoding and/or decoding techniques.

DETAILED DESCRIPTION

Figure 1:
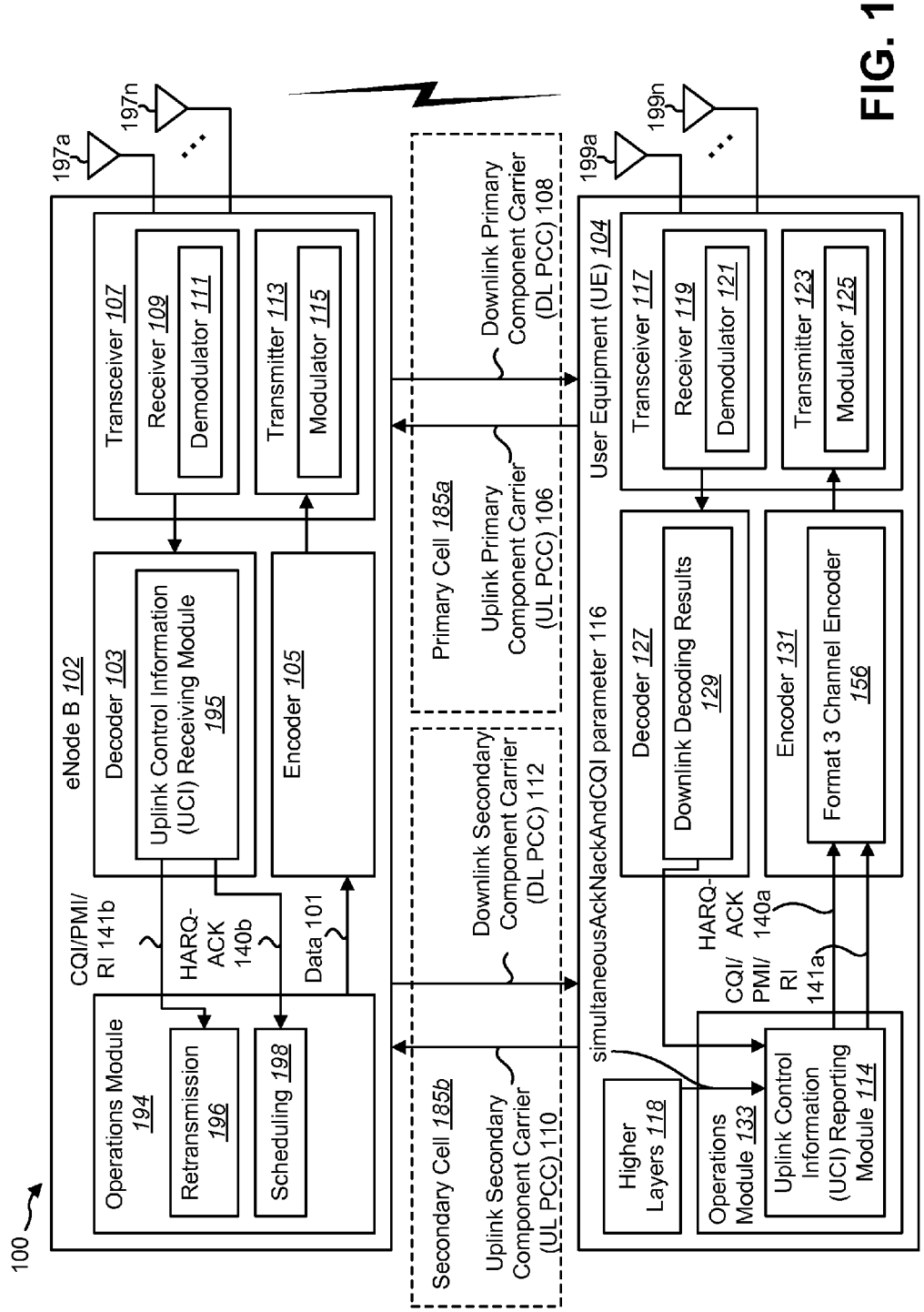
FIG. 1 is a block diagram illustrating a wireless communication system using uplink control information (UCI) multiplexing.

A method for reporting uplink control information (UCI) on a user equipment (UE) is described. The method includes determining whether a collision between a hybrid automatic repeat request acknowledgement (HARQ-ACK) and a channel quality indicator/precoding matrix index/rank indication (CQI/PMI/RI) is detected. The method also includes determining whether a simultaneousAckNackAndCQI parameter provided by higher layers is set to TRUE. The UCI is generated with the HARQ-ACK using physical uplink control channel (PUCCH) Format 3.

The simultaneousAckNackAndCQI parameter may not set to TRUE. The CQI/PMI/RI may be dropped. A collision between the HARQ-ACK and the CQI/PMI/RI may be detected. Generating the UCI may include multiplexing the CQI/PMI/RI and the HARQ-ACK using PUCCH Format 3.

A collision between the HARQ-ACK and the CQI/PMI/RI may not be detected. Either the CQI/PMI/RI or the HARQ-ACK may be selected for the UCI. The CQI/PMI/RI may be selected for the UCI. The UCI may be generated with the CQI/PMI/RI using PUCCH Format 2/2a/2b. Carrier aggregation may be configured for the UE.

Generating the UCI with the HARQ-ACK using PUCCH Format 3 may include coding HARQ-ACK message bits using a block coder to obtain an encoded HARQ-ACK block and performing circular repetition of the encoded HARQ-ACK block to obtain an output bit sequence. The block coder may use a Reed-Muller code. The Reed-Muller code may be a (32, O) block code or a (16, O) block code.

Multiplexing the CQI/PMI/RI and the HARQ-ACK using PUCCH Format 3 may include coding HARQ-ACK message bits using a first block coder to obtain an encoded HARQ-ACK block, coding CQI/PMI/RI message bits using a second block coder to obtain an encoded CQI/PMI/RI block and performing circular repetition of the encoded HARQ-ACK block and the encoded CQI/PMI/RI block to obtain an output bit sequence. The first block coder may use a first Reed-Muller code and the second block coder may use a second Reed-Muller code. The first Reed-Muller code may be a (32, O) block code and the second Reed-Muller code may be a (32, O) block code. The first Reed-Muller code may instead be a (48, O) block code and the second Reed-Muller code may be a (48, O) block code.

A user equipment (UE) configured for reporting uplink control information (UCI) is also described. The UE includes a processor, memory in electronic communication with the processor and instructions stored in the memory. The instructions are executable to determine whether a collision between a hybrid automatic repeat request acknowledgement (HARQ-ACK) and a channel quality indicator/precoding matrix index/rank indication (CQI/PMI/RI) is detected. The instructions are also executable to determine whether a simultaneousAckNackAndCQI parameter provided by higher layers is set to TRUE. The instructions are further executable to generate the UCI with the HARQ-ACK using physical uplink control channel (PUCCH) Format 3.

A non-transitory, tangible computer-readable medium for reporting uplink control information (UCI) is described. The computer-readable medium includes executable instructions for determining whether a collision between a hybrid automatic repeat request acknowledgement (HARQ-ACK) and a channel quality indicator/precoding matrix index/rank indication (CQI/PMI/RI) is detected. The computer-readable medium also includes executable instructions for determining whether a simultaneousAckNackAndCQI parameter provided by higher layers is set to TRUE. The computer-readable medium further includes generating the UCI with the HARQ-ACK using physical uplink control channel (PUCCH) Format 3.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8 and Release-10). However, the scope of the present disclosure should not be limited in this regard. At least some aspects of the systems and methods disclosed herein may be utilized in other types of wireless communication systems.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 using uplink control information (UCI) multiplexing. An eNode B 102 may be in wireless communication with one or more user equipments (UEs) 104. An eNode B 102 may be referred to as an access point, a Node B, a base station or some other terminology. Likewise, a user equipment (UE) 104 may be referred to as a mobile station, a subscriber station, an access terminal, a remote station, a user terminal, a terminal, a handset, a subscriber unit, a wireless communication device, or some other terminology. An eNode B 102 may transmit data to a user equipment (UE) 104 over a radio frequency (RF) communication channel.

Communication between a user equipment (UE) 104 and an eNode B 102 may be accomplished using transmissions over a wireless link, including an uplink and a downlink. The uplink refers to communications sent from a user equipment (UE) 104 to an eNode B 102. The downlink refers to communications sent from an eNode B 102 to a user equipment (UE) 104. The communication link may be established using a single-input and single-output (SISO), multiple-input and single-output (MISO) or a multiple-input and multiple-output (MIMO) system. A MIMO system may include both a transmitter and a receiver equipped with multiple transmit and receive antennas. Thus, an eNode B 102 may have multiple antennas and user equipment (UE) 104 may have multiple antennas. In this way, the eNode B 102 and the user equipment (UE) 104 may each operate as either a transmitter or a receiver in a MIMO system. One benefit of a MIMO system is improved performance if the additional dimensionalities created by the multiple transmit and receive antennas are utilized.

The user equipment (UE) 104 communicates with eNode Bs 102 using one or more antennas 199a-n. The user equipment (UE) 104 may include a transceiver 117, a decoder 127, an encoder 131 and an operations module 133. The transceiver 117 may include a receiver 119 and a transmitter 123. The receiver 119 may receive signals from the eNode B 102 using one or more antennas 199a-n. For example, the receiver 119 may receive and demodulate received signals using a demodulator 121. The transmitter 123 may transmit signals to the eNode B 102 using one or more antennas 199a-n. For example, the transmitter 123 may modulate signals using a modulator 125 and transmit the modulated signals.

The receiver 119 may provide a demodulated signal to the decoder 127. The user equipment (UE) 104 may use the decoder 127 to decode signals and make downlink decoding results 129. The downlink decoding results 129 may indicate whether data was received correctly. For example, the downlink decoding results 129 may indicate whether a packet was correctly or erroneously received (i.e., positive acknowledgement, negative acknowledgement or discontinuous transmission (no signal)).

The operations module 133 may be a software and/or hardware module used to control user equipment (UE) 104 communications. For example, the operations module 133 may determine when the user equipment (UE) 104 requires resources to communicate with an eNode B 102.

In $3^{rd}$ Generation Partnership Project (3GPP) Long Term Evolution (LTE)—Advanced, additional control feedback will have to be sent on control channels to accommodate MIMO and carrier aggregation (CA). Carrier aggregation refers to transmitting data on multiple component carriers (CC) that are contiguously or separately located. Both the positive-acknowledge and negative-acknowledge (ACK/NACK) bits and other control information may be transmitted using the physical uplink control channel (PUCCH).

The user equipment (UE) 104 may transmit uplink control information (UCI) to an eNode B 102 on the uplink. Besides ACK/NACK bits, the uplink control information (UCI) may include a channel quality indicator (CQI), a precoding matrix index (PMI), rank indication (RI), a scheduling request (SR) and a hybrid automatic repeat request acknowledgement (HARQ-ACK) 140a. HARQ-ACK 140a means ACK (positive-acknowledgement) and/or NACK (negative-acknowledgement) and/or DTX (discontinuous transmission) responses for HARQ operation. In one configuration, the CQI/PMI/RI 141a and the HARQ-ACK 140a may be separately coded. In another configuration, the CQI/PMI/RI 141a and the HARQ-ACK 140a may be jointly coded. Herein, CQI/PMI/RI 141 refers to CQI and/or PMI and/or RI. ACK/NACK refers to ACK and/or NACK. CQI/PMI/RI 141 and HARQ-ACK 140 refers to (CQI and/or PMI and/or RI) AND HARQ-ACK 140). CQI/PMI/RI 141 or HARQ-ACK refers to (CQI and/or PMI and/or RI) OR HARQ-ACK 140).

The CQI/PMI/RI 141a and the HARQ-ACK 140a may be generated by the uplink control information (UCI) reporting module 114 and transferred to a Format 3 channel encoder 156 that is part of the encoder 131. The Format 3 channel encoder 156 may generate uplink control information (UCI) using Format 3. The Format 3 channel encoder 156 is discussed in additional detail below in relation to FIG. 8 and FIG. 9. Format 3 is a new format for LTE-A which carries 48 coded bits. One benefit of using Format 3 is that Format 3 can carry a larger size of payload than the other Formats and can achieve more robustness using a small size of payload.

The user equipment (UE) 104 may also transmit a reference signal (RS) to an eNode B 102. The uplink control information (UCI) may be transmitted using the physical uplink control channel (PUCCH). One or more physical uplink control channel (PUCCH) reference signal (RS) symbols are included in a physical uplink control channel (PUCCH) signal transmission on each slot. Depending on the size of the uplink control information (UCI) payload, new methods of transmitting the uplink control information (UCI) to an eNode B 102 may be necessary.

In LTE Release-8, only one uplink component carrier (CC) and one downlink component carrier (CC) can be used for each user equipment (UE) 104. The uplink control information (UCI) such as ACK/NACK bits for hybrid ARQ (HARQ) and periodic channel quality indicators (CQI), precoding matrix index (PMI) and rank indication (RI) can be sent on the physical uplink control channel (PUCCH) or on the physical uplink shared channel (PUSCH). In one configuration, there may be a first uplink control information (UCI) that is scheduled on the physical uplink control channel (PUCCH) and a second uplink control information (UCI) that is scheduled on the physical uplink shared channel (PUSCH). In some conditions, for example in cases where a collision between the physical uplink control channel (PUCCH) and the physical uplink shared channel (PUSCH) occurs, the uplink control information (UCI) that is scheduled on the physical uplink control channel (PUCCH) may be transmitted on the physical uplink shared channel (PUSCH).

The physical uplink control channel (PUCCH) may occupy one resource block (RB) at each slot. Thus, a very limited amount of information can be transmitted on the physical uplink control channel (PUCCH). With physical uplink control channel (PUCCH) Format 1/1a/1b, only one or two ACK/NACK bits are transmitted. With physical uplink control channel (PUCCH) Format 2/2a/2b, one or two ACK/NACK bits can be simultaneously transmitted with four to 11 bits of CQI/PMI/RI 141. Thus, the maximum payload size that can be carried on a Release-8 physical uplink control channel (PUCCH) is 13 bits.

Format 1a may be used for a 1-bit HARQ-ACK 140. Format 1a may also be used for a 1-bit HARQ-ACK 140 with positive scheduling request (SR) in frequency division duplexing (FDD). Format 1b may be used for a 2-bit HARQ-ACK 140 or for a 2-bit HARQ-ACK 140 with a positive scheduling request (SR). Format 1b may also be used for an HARQ-ACK 140 with channel selection.

Format 2 may be used for a CQI/PMI or an RI report when the CQI/PMI or the RI report is not multiplexed with the HARQ-ACK 140. Format 2 may also be used for a CQI/PMI or an RI report when the CQI/PMI or the RI report is multiplexed with the HARQ-ACK 140 for extended cyclic prefix. Format 2a may be used for a CQI/PMI or an RI report that is multiplexed with a 1-bit HARQ-ACK 140 for normal cyclic prefix. Format 2b may be used for a CQI/PMI or an RI report that is multiplexed with a 2-bit HARQ-ACK 140 for normal cyclic prefix. The problem is how to multiplex the CQI/PMI/RI 141 and more than 2 bits of HARQ-ACK 140 for carrier aggregation.

In 3GPP Long Term Evolution (LTE) Release 10 (LTE-A or Advanced EUTRAN), carrier aggregation was introduced. Carrier aggregation may also be referred to as cell aggregation. Carrier aggregation is supported in both the uplink and the downlink with up to five component carriers. Each component carrier may have a transmission bandwidth of up to 110 resource blocks. In carrier aggregation, two or more component carriers are aggregated to support wider transmission bandwidths up to 100 megahertz (MHz). A user equipment (UE) 104 may simultaneously receive or transmit one or multiple component carriers, depending on the capabilities of the user equipment (UE) 104.

The uplink control information (UCI) generated by the uplink control information (UCI) reporting module 114 may be dependent on a simultaneousAckNackAndCQI parameter 116. For example, the format used for transmitting the uplink control information (UCI) may be dependent on the simultaneousAckNackAndCQI parameter 116. The simultaneousAckNackAndCQI parameter 116 may be provided by higher layers 118 (e.g., the radio resource control (RRC) layer) on the user equipment (UE) 104.

A user equipment (UE) 104 may communicate with an eNode B 102 using multiple cells 185 at the same time. For example, a user equipment (UE) 104 may communicate with an eNode B 102 using a primary cell 185a while simultaneously communicating with the eNode B 102 using secondary cells 185b.

An eNode B 102 may include a transceiver 107 that includes a receiver 109 and a transmitter 113. An eNode B 102 may additionally include a decoder 103, an encoder 105 and an operations module 194. An eNode B 102 may receive uplink control information (UCI) using its one or more antennas 197a-n and its receiver 109. The receiver 109 may use the demodulator 111 to demodulate the uplink control information (UCI).

The decoder 103 may include an uplink control information (UCI) receiving module 195. An eNode B 102 may use the uplink control information (UCI) receiving module 195 to decode and interpret the uplink control information (UCI) received by the eNode B 102. The eNode B 102 may use the decoded uplink control information (UCI) to perform certain operations, such as retransmit one or more packets based or schedule communication resources for the user equipment (UE) 104. The uplink control information (UCI) may include a CQI/PMI/RI 141b and/or an HARQ-ACK 140b.

The operations module 194 may include a retransmission module 196 and a scheduling module 198. The retransmission module 196 may determine which packets to retransmit (if any) based on the uplink control information (UCI). The scheduling module 198 may be used by the eNode B 102 to schedule communication resources (e.g., bandwidth, time slots, frequency channels, spatial channels, etc.). The scheduling module 198 may use the uplink control information (UCI) to determine whether (and when) to schedule communication resources for the user equipment (UE) 104.

The operations module 194 may provide data 101 to the encoder 105. For example, the data 101 may include packets for retransmission and/or a scheduling grant for the user equipment (UE) 104. The encoder 105 may encode the data 101, which may then be provided to the transmitter 113. The transmitter 113 may modulate the encoded data using the modulator 115. The transmitter 113 may transmit the modulated data to the user equipment (UE) 104 using one or more antennas 197a-n.

When carrier aggregation is configured, a user equipment (UE) 104 may have only one Radio Resource Control (RRC) connection with the network. At the RRC connection establishment/re-establishment/handover, one serving cell (i.e., the primary cell 185a) provides the non-access stratum (NAS) mobility information (e.g., Tracking Area Identity (TAI)) and the security input.

In the downlink, the carrier corresponding to the primary cell 185a is the downlink primary component carrier (DL PCC) 108. In the uplink, the carrier corresponding to the primary cell 185a is the uplink primary component carrier (UL PCC) 106. Depending on the capabilities of the user equipment (UE) 104, one or more secondary cells 185b may be configured to form a set of serving cells with the primary cell 185a. In the downlink, the carrier corresponding to the secondary cell 185b is the downlink secondary component carrier (DL SCC) 112. In the uplink, the carrier corresponding to the secondary cell 185b is the uplink secondary component carrier (UL SCC) 110. The number of downlink component carriers may be different from the number of uplink component carriers because multiple cells may share one uplink component carrier.

If carrier aggregation is configured, a user equipment (UE) 104 may have multiple serving cells: a primary cell 185a and one or more secondary cells 185b. From a network perspective, the same serving cell may be used as the primary cell 185a by one user equipment (UE) 104 and used as a secondary cell 185b by another user equipment (UE) 104. A primary cell 185a that is operating according to Rel-8/9 is equivalent to the Rel-8/9 serving cell. When operating according to Rel-10, there may be one or more secondary cells 185b in addition to the primary cell 185a if carrier aggregation is configured.

A number of spatial channels may be available on each serving cell by using multiple antennas at a transmitter and a receiver. Therefore, multiple codewords (up to 2 codewords) may be transmitted simultaneously. If the user equipment (UE) 104 is configured with 5 component carriers and 2 codewords for each of the component carriers, 10 acknowledgement/negative acknowledgements (ACK/NACK) for a single downlink subframe may be generated by the user equipment (UE) 104 for a single uplink subframe. One benefit of using carrier aggregation is that additional downlink and/or uplink data may be transmitted.

Figure 2:
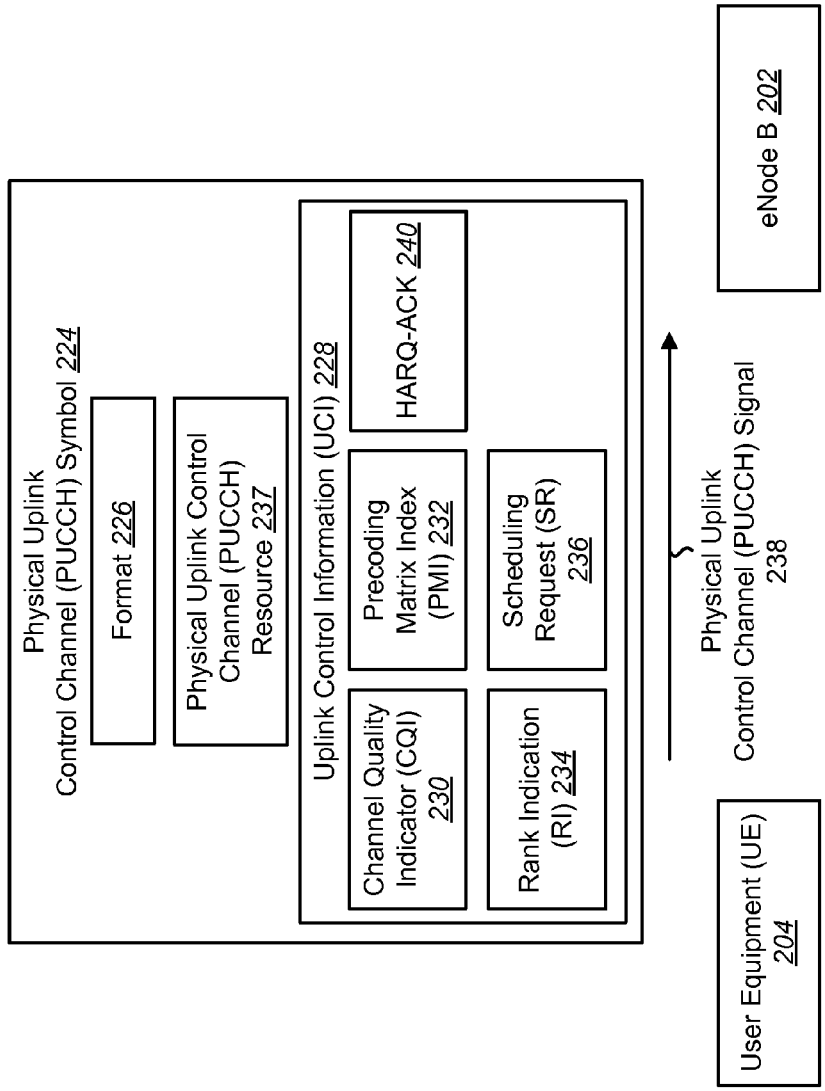
FIG. 2 is a block diagram illustrating transmissions from a user equipment (UE) to an eNode B.

FIG. 2 is a block diagram illustrating transmissions from a user equipment (UE) 204 to an eNode B 202. The user equipment (UE) 204 may transmit a physical uplink control channel (PUCCH) symbol 224 via a physical uplink control channel (PUCCH) signal 238 to the eNode B 202.

The physical uplink control channel (PUCCH) symbol 224 may include uplink control information (UCI) 228. The uplink channel information (UCI) 228 may include a channel quality indicator (CQI) 230, a precoding matrix index (PMI) 232, a rank indication (RI) 234, a scheduling request (SR) 236 and/or an HARQ-ACK 240. The CQI/PMI/RI 141 may be scheduled on the physical uplink control channel (PUCCH) periodically by higher layer signaling. The physical uplink control channel (PUCCH) may be sent only on the primary cell 185a, while the physical uplink shared channel (PUSCH) may be sent on the primary cell 185a and/or on one or more secondary cells 185. The HARQ-ACK 240 is generated dynamically based on the detection of a physical downlink shared channel (PDSCH). A collision may occur between a CQI/PMI/RI 141 and an HARQ-ACK 240 in the same subframe.

The physical uplink control channel (PUCCH) symbol 224 may further include a format 226 for which the physical uplink control channel (PUCCH) symbol 224 was transmitted. For example, the physical uplink control channel (PUCCH) symbol 224 may be transmitted using Format 1/1a/1b, Format 2/2a/2b, Format 3 or any other new formats. As used herein, Format 1/1a/1b represents Format 1 and/or Format 1a and/or Format 1b. Also, as used herein, Format 2/2a/2b represents Format 2 and/or Format 2a and/or Format 2b. The physical uplink control channel (PUCCH) symbol 224 may also include a physical uplink control channel (PUCCH) resource 237. The physical uplink control channel (PUCCH) resource 237 for the CQI/PMI/RI 141 may be periodically pre-assigned by a higher layer, which uses Format 2/2a/2b. The eNode B 202 may dynamically allocate the physical downlink shared channel (PDSCH); the HARQ-ACK 240 is then dynamically generated in a subframe. Therefore, sometimes the CQI/PMI/RI 141 may collide with the HARQ-ACK 240 is the same subframe.

To avoid dropping one of them in collisions between a CQI/PMI/RI 141 and an HARQ-ACK 240, the CQI/PMI/RI 141 may be multiplexed with the HARQ-ACK 240 on the physical uplink control channel (PUCCH). This is because of the single carrier property for uplink in an LTE system (i.e., a user equipment (UE) 204 should not transmit multiple channels simultaneously on one component carrier). Format 3 may be used for multiplexing the CQI/PMI/RI 141 with the HARQ-ACK 240. If the CQI/PMI/RI 141 and the HARQ-ACK 240 are not multiplexed, the CQI/PMI/RI 141 may be dropped by the user equipment (UE) 204. Thus, one benefit of using Format 3 is that the CQI/PMI/RI 141 may be multiplexed with the HARQ-ACK 240, allowing for the uplink transmission of additional data.

A user equipment (UE) 104 that supports up to 4 ACK/NACK bits can use physical uplink control channel (PUCCH) Format 1a/1b with channel selection for transmission of the HARQ-ACK 240. A user equipment (UE) 104 that supports more than 4 ACK/NACK bits is configured by higher layer 118 signaling to use either physical uplink control channel (PUCCH) Format 1a/1b with channel selection or physical uplink control channel (PUCCH) Format 3 for transmission of the HARQ-ACK 140. A user equipment (UE) 104 may determine the number of HARQ-ACK 140 bits based on the number of configured serving cells and the downlink transmission modes configured for each serving cell. A user equipment may use 2 HARQ-ACK 140 bits for a serving cell configured with a downlink transmission mode that supports up to two transport blocks and 1 HARQ-ACK 140 bit otherwise.

For physical uplink control channel (PUCCH) Format 3, a user equipment (UE) 104 may transmit a NACK for a DTX HARQ-ACK 140 response for a transport block associated with a configured serving cell. DTX means that the user equipment (UE) 104 has missed the downlink assignment.

Figure 3:
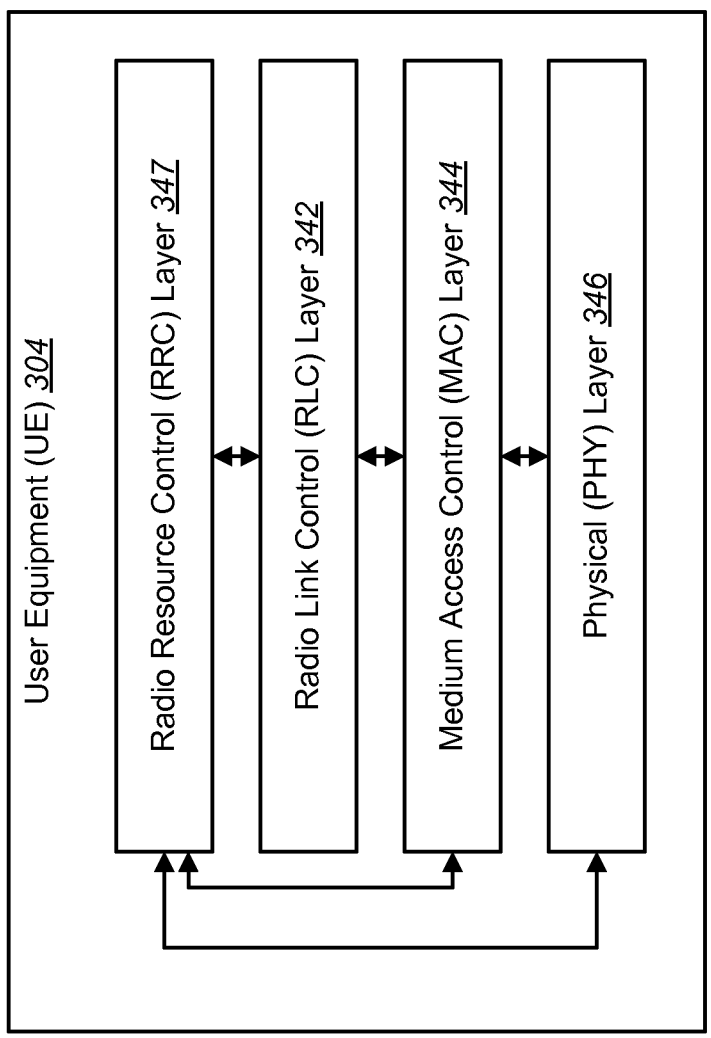
FIG. 3 is a block diagram illustrating the layers used by a user equipment (UE)

FIG. 3 is a block diagram illustrating the layers used by a user equipment (UE) 304. The user equipment (UE) 304 of FIG. 3 may be one configuration of the user equipment (UE) 104 of FIG. 1. The user equipment (UE) 304 may include a radio resource control (RRC) layer 347, a radio link control (RLC) layer 342, a medium access control (MAC) layer 344 and a physical (PHY) layer 346. These layers may be referred to as higher layers 118. The user equipment (UE) 304 may include additional layers not shown in FIG. 3.

Figure 4:
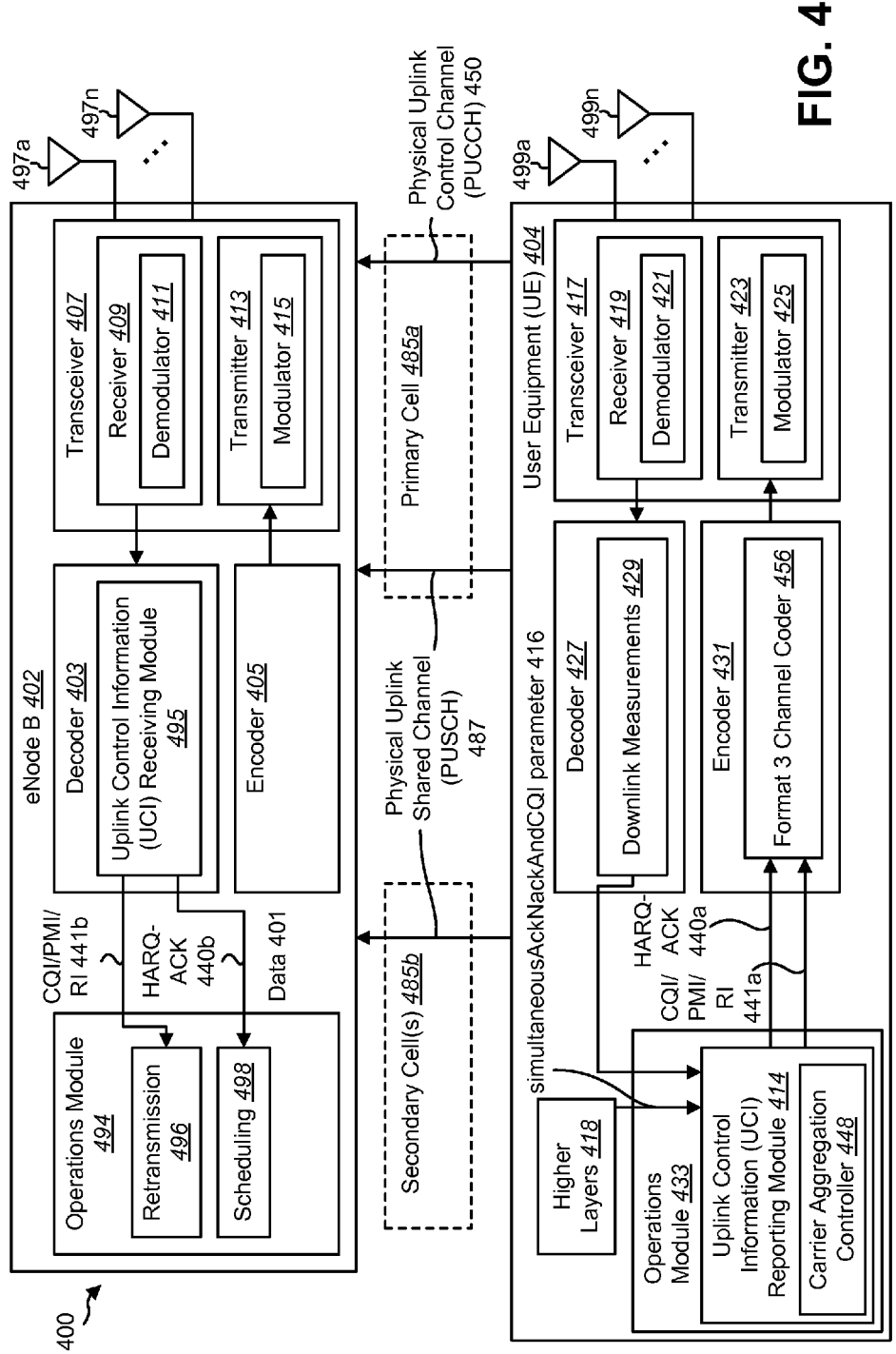
FIG. 4 is a block diagram illustrating carrier aggregation control used in a wireless communication system.

FIG. 4 is a block diagram illustrating carrier aggregation control used in a wireless communication system 400. The wireless communication system 400 may include a user equipment (UE) 404 and an eNode B 402. The user equipment (UE) 404 of FIG. 4 may be one configuration of the user equipment (UE) 104 of FIG. 1. The reference numbers 414, 416, 417, 418, 419, 421, 423, 425, 427, 429, 431, 433 440a, 441a, 448, 456 and 499a-n in FIG. 4 refer to similar items as the corresponding reference numbers discussed above in relation to FIG. 1. Also, the reference numbers 401, 403, 405, 407, 409, 411, 413, 415, 440b, 441b, 494, 495, 496, 497a-n and 498 in FIG. 4 refer to similar items as the corresponding reference numbers discussed above in relation to FIG. 1.

The user equipment (UE) 404 may include an uplink control information (UCI) reporting module 414. The uplink control information (UCI) reporting module 414 may generate uplink control information (UCI) 228 that is transmitted to the eNode B 402 via the physical uplink control channel (PUCCH) 450 or via the physical uplink shared channel (PUSCH). The uplink control information (UCI) reporting module 414 may include a carrier aggregation controller 448. The carrier aggregation controller 448 may indicate to the uplink control information (UCI) reporting module 414 whether carrier aggregation is configured (enabled). Whether carrier aggregation is configured may be implicitly identified when the user equipment (UE) 104 has more than one configured serving cell or when the user equipment (UE) 104 is configured with more than one serving cell.

As discussed above, if carrier aggregation is configured (enabled), the user equipment (UE) 404 may send uplink control information (UCI) 228 to an eNode B 402 on the physical uplink control channel (PUCCH) 450 on a primary cell 485a and/or one or more secondary cells 485b. In one configuration, the user equipment (UE) 404 may use up to five cells 485 for the reception of downlink data and/or downlink control information on the physical downlink control channel (PDCCH) and/or the physical downlink shared channel (PDSCH) and/or other downlink channels. The user equipment (UE) 404 may also use up to five cells 485 for the transmission of uplink control information (UCI) 228 on the physical uplink control channel (PUCCH) 450 and/or the physical uplink shared channel (PUSCH) 487. The number of downlink component carriers (cells) may be different from the number of uplink component carriers (cells) because multiple cells may share one uplink component carrier (cell). If carrier aggregation is not configured (enabled), secondary cells 485 (component carriers) are not aggregated.

Figure 5:
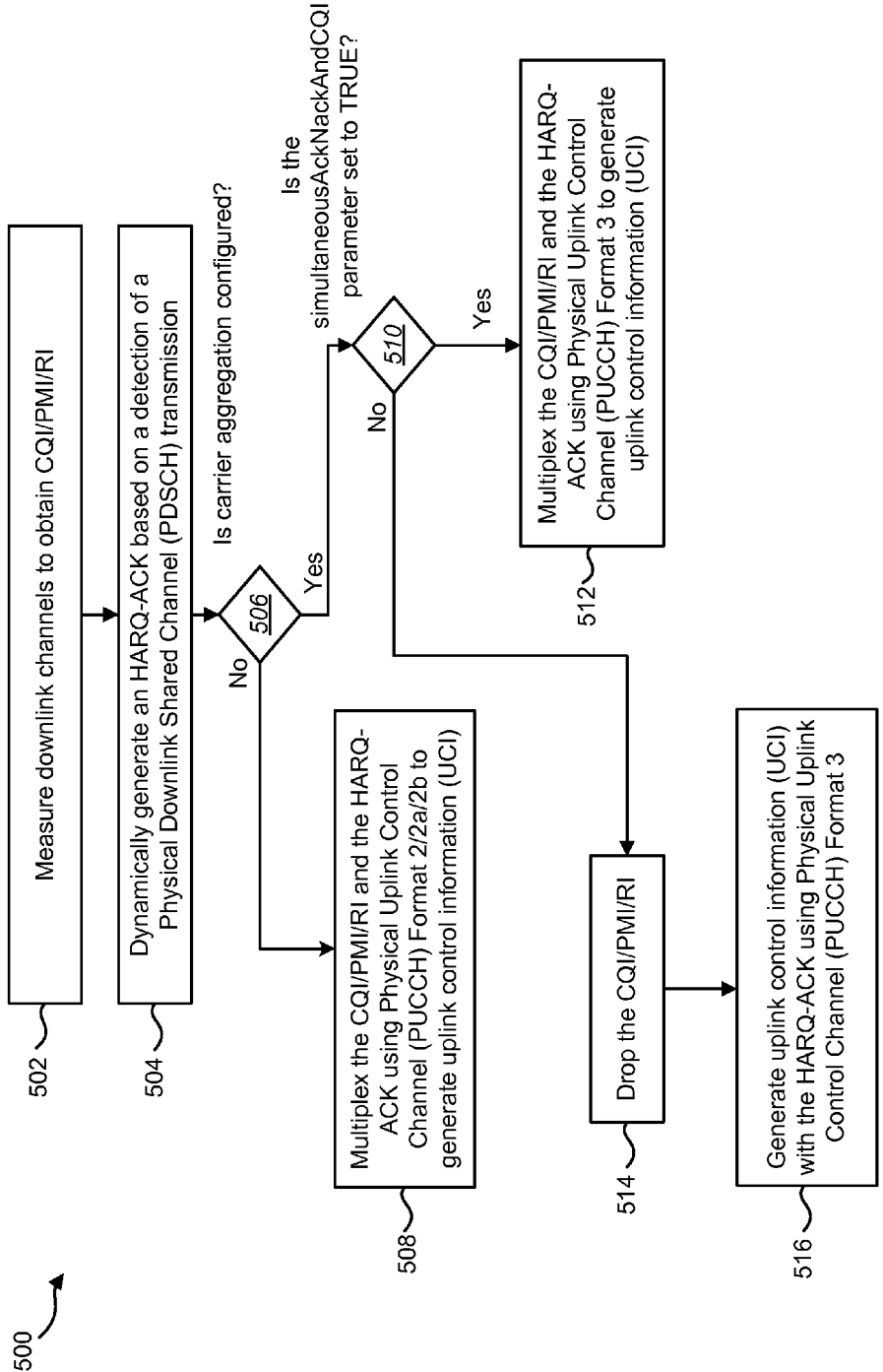
FIG. 5 is a flow diagram of a method for generating uplink control information (UCI)

FIG. 5 is a flow diagram of a method 500 for generating uplink control information (UCI) 228. The method 500 may be performed by a user equipment (UE) 104. The user equipment (UE) 104 may measure 502 downlink channels to obtain CQI/PMI/RI 141. The user equipment (UE) 104 may dynamically generate 504 an HARQ-ACK 140 based on the detection of a physical downlink shared channel (PDSCH) transmission. The detection of a physical downlink shared channel (PDSCH) is done by the detection of a downlink assignment on a physical downlink control channel (PDCCH) and/or the detection of a configured downlink assignment for semi-persistent scheduling.

The user equipment (UE) 104 may determine 506 whether carrier aggregation is configured. In one configuration, the user equipment (UE) 104 may use a carrier aggregation controller 448 to determine whether carrier aggregation is configured. If carrier aggregation is not configured, the user equipment (UE) 104 may multiplex 508 the CQI/PMI/RI 141 and the HARQ-ACK 140 using physical uplink control channel (PUCCH) Format 2/2a/2b to generate uplink control information (UCI) 228 in a collision case.

If carrier aggregation is configured, the user equipment (UE) 104 may determine 510 whether the simultaneousAckNackAndCQI parameter 116 is set to TRUE. As discussed above, the simultaneousAckNackAndCQI parameter 116 is signaled by higher layers 118 on the user equipment (UE) 104. If the simultaneousAckNackAndCQI parameter 118 is set to TRUE, the user equipment (UE) 104 may multiplex 512 the CQI/PMI/RI 141 and the HARQ-ACK 140 using physical uplink control channel Format 3 to generate uplink control information (UCI) 228 in a collision case.

When carrier aggregation is configured and multiple physical downlink shared channels (PDSCHs) are assigned to the user equipment (UE) 104 in a downlink subframe corresponding to an uplink subframe that is not assigned CQI/PMI/RI 141 transmission resources, the user equipment (UE) 104 may use physical uplink control channel (PUCCH) Format 3 with up to a 10 bit HARQ-ACK 140 to generate the uplink control information (UCI) 228. Thus, another benefit of using Format 3 is an increase in the number of HARQ-ACK 140 bits from 2 bits in Release 8/9 to 10 bits.

When carrier aggregation is configured, Format 3 may not always be used for the HARQ-ACK 140. For example, when the user equipment (UE) 104 is configured with multiple serving cells and the user equipment (UE) 104 detects a downlink assignment only for the physical downlink shared channel (PDSCH) on the primary cell 185a, the user equipment (UE) 104 may use physical uplink control channel (PUCCH) Format 1a/1b and the resources to fall back to Release 8/9 mode for a non-collision case. In a collision case, if the simultaneousAckNackAndCQI parameter is set to TRUE, the user equipment (UE) 104 may use physical uplink control channel (PUCCH) Format 2/2a/2b and its resource for the HARQ-ACK 140.

If the simultaneousAckNackAndCQI parameter 118 is not set to TRUE, the user equipment (UE) 104 may drop 514 the CQI/PMI/RI 141 in a collision case. The user equipment (UE) 104 may then generate 516 uplink control information (UCI) 228 with the HARQ-ACK 140 using physical uplink control channel (PUCCH) Format 3. Format 3 is a new format for LTE-A. Format 3 is discussed in additional detail below in relation to FIG. 8 and FIG. 9. The steps in FIG. 5 may be ordered other than as shown. For example, the measurement timing for step 502 is not defined. As another example, step 506 may occur after step 510.

Figure 6:
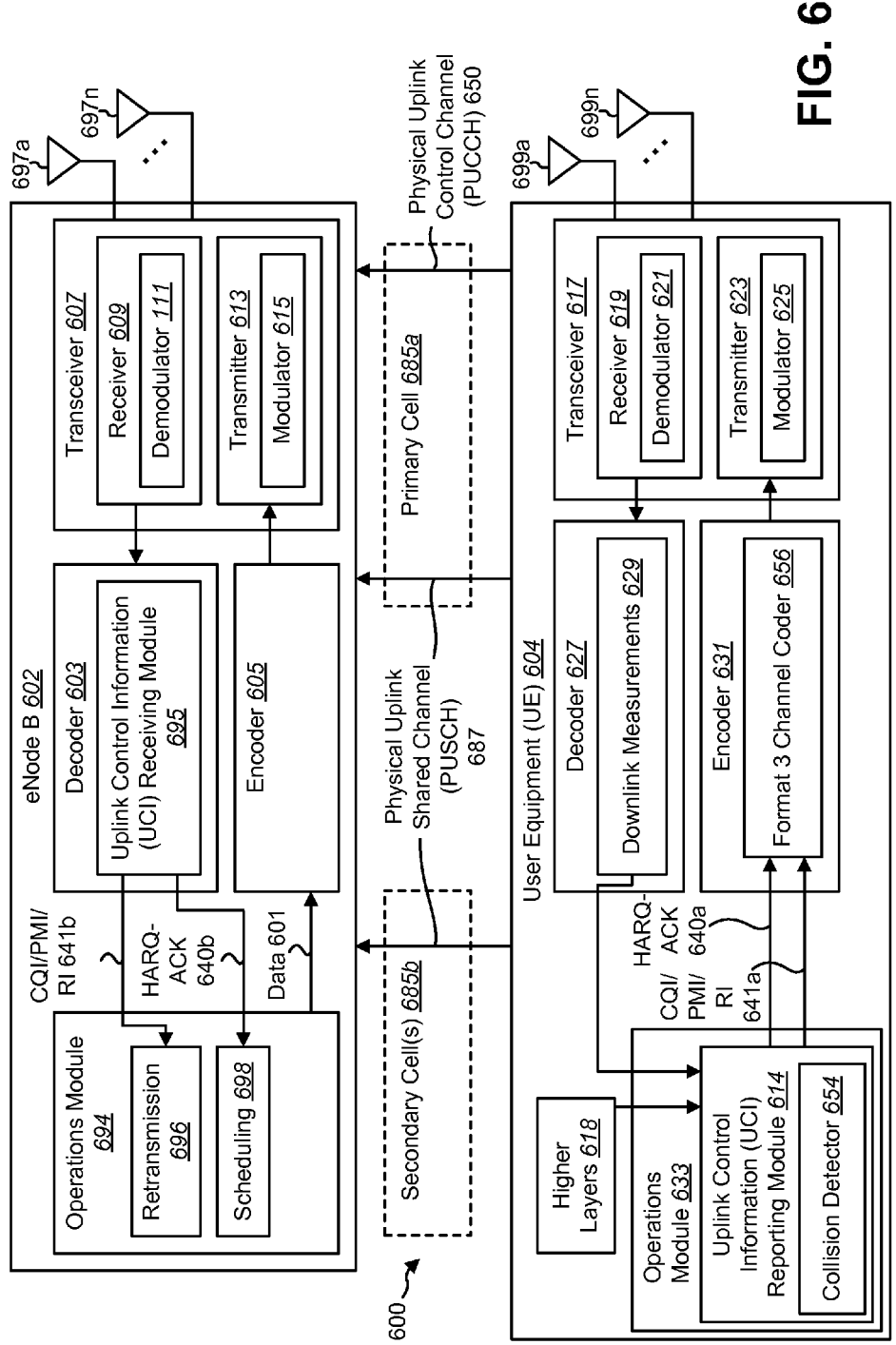
FIG. 6 is a block diagram illustrating collision detection used in a wireless communication system.

FIG. 6 is a block diagram illustrating collision detection used in a wireless communication system 600. The wireless communication system 600 may include a user equipment (UE) 604 and an eNode B 602. The reference numbers 614, 617, 618, 619, 621, 623, 625, 627, 629, 631, 633, 640a, 641a, 654 and 699a-n in FIG. 6 refer to similar items as the corresponding reference numbers discussed above in relation to FIG. 1. Also, the reference numbers 601, 603, 605, 607, 609, 611, 613, 615, 640b, 641b, 694, 695, 696, 697a-n and 698 in FIG. 6 refer to similar items as the corresponding reference numbers discussed above in relation to FIG. 1.

The user equipment (UE) 604 may include an uplink control information (UCI) reporting module 614. The uplink control information (UCI) reporting module 614 may generate uplink control information (UCI) 228 that is transmitted to the eNode B 602 via the physical uplink control channel (PUCCH) 650 on a primary cell 685a and/or secondary cells 685b. In one configuration, the user equipment (UE) 104 may use up to five cells 685 for the reception of downlink data and/or downlink control information on the physical downlink control channel (PDCCH) and/or the physical downlink shared channel (PDSCH) and/or other downlink channels. The user equipment (UE) 104 may use up to five cells 685 for the transmission of uplink data and/or uplink control information (UCI) 228 on the physical uplink control channel (PUCCH) 450 and/or the physical uplink shared channel (PUSCH) 487. The number of downlink component carriers may be different from the number of uplink component carriers because multiple cells may share one uplink component carrier.

The uplink control information (UCI) reporting module 614 may include a collision detector 654. The collision detector 654 may detect whether a collision has occurred or will occur between a CQI/PMI/RI 641a and an HARQ-ACK 640a in the same subframe without the physical uplink shared channel (PUSCH) 687.

Even if a collision has occurred or will occur, if the physical uplink control channel (PUCCH) 650 is not transmitted, the collision may be irrelevant. There are certain conditions when the user equipment (UE) 604 does not transmit the physical uplink control channel (PUCCH) 650. In one configuration, the simultaneous transmission of the physical uplink control channel (PUCCH) 650 and the physical uplink shared channel (PUSCH) 687 on any primary cell 685a and/or secondary cells 685b may be allowed. In this case, the physical uplink control channel (PUCCH) 650 is not overridden by the physical uplink shared channel (PUSCH) 687. Therefore, the physical uplink control channel (PUCCH) 650 is transmitted.

In one configuration, when the physical uplink control channel (PUCCH) 650 and the physical uplink shared channel (PUSCH) 687 collide on the primary cell 685a in the same subframe, only the physical uplink shared channel (PUSCH) 687 may be transmitted on the primary cell 685a; the uplink control information (UCI) 228 that is scheduled on the physical uplink control channel (PUCCH) 650 may be transmitted on the physical uplink shared channel (PUSCH) 687.

In this case, the simultaneous transmission of the physical uplink control channel (PUCCH) 650 and the physical uplink shared channel (PUSCH) 687 on any primary cell 685a and/or secondary cells 685b may be allowed. In one configuration, for the cases where the physical uplink control channel (PUCCH) 650 and the physical uplink shared channel (PUSCH) 687 on any primary cell 685a or secondary cell 685b are collided, the transmission of only the physical uplink shared channels (PUSCHs) 687 may be allowed while the uplink control information (UCI) 228 which is scheduled on the physical uplink control channel (PUCCH) 650 is transmitted on the physical uplink shared channel (PUSCH) 687.

If a collision between a CQI/PMI/RI 641a and an HARQ-ACK 640 has occurred or will occur, the user equipment (UE) 604 may multiplex the CQI/PMI/RI 641a and the HARQ-ACK 640a using physical uplink control channel (PUCCH) Format 3 or drop the CQI/PMI/RI 641a. The user equipment (UE) 604 may send the uplink control information (UCI) 228 to an eNode B 602 using the physical uplink control channel (PUCCH) 650 on the primary cell 685a or using the physical uplink shared channel (PUSCH) 687 on any of the primary cell 685a or the secondary cells 685b.

Figure 7:
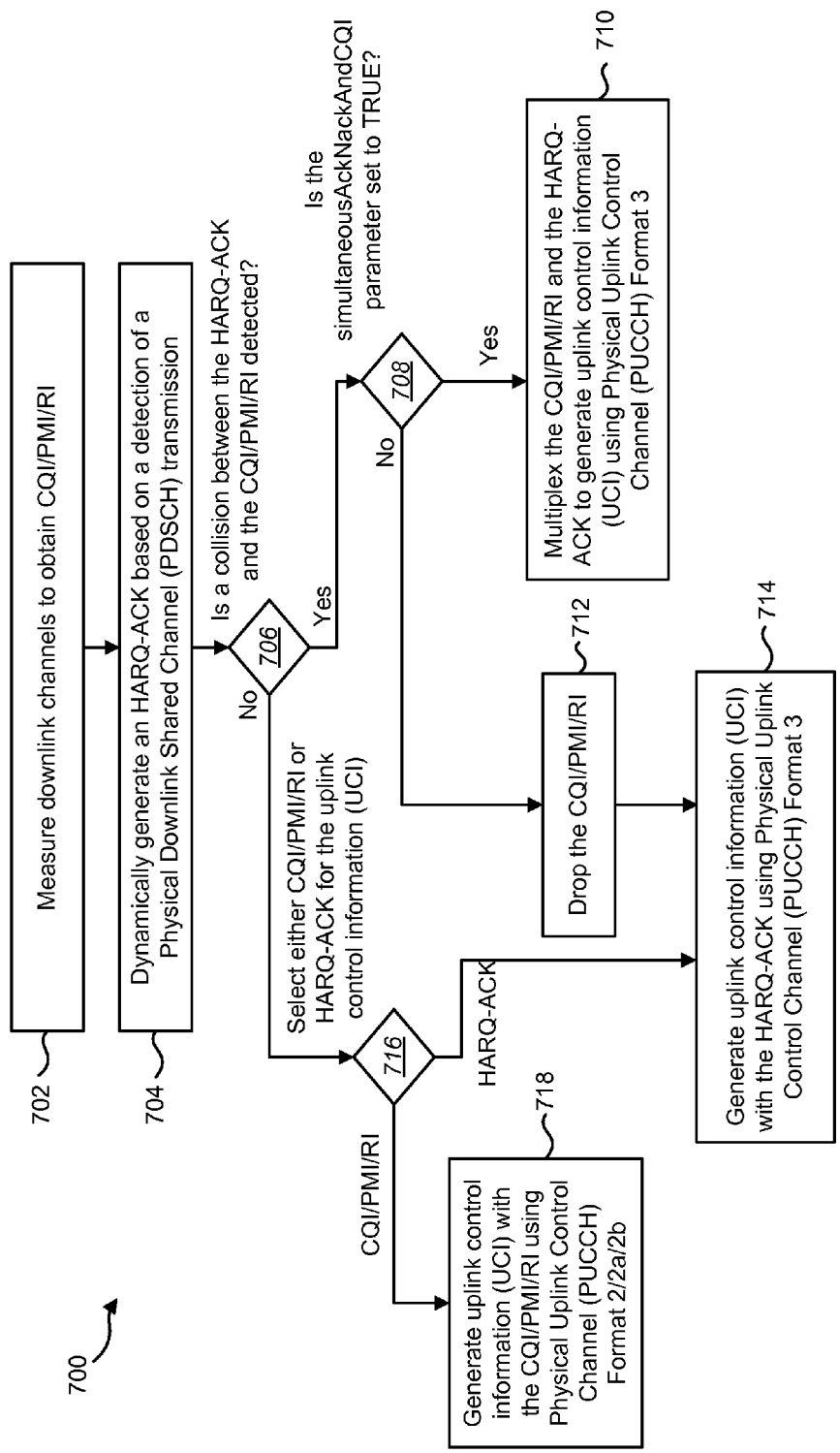
FIG. 7 is a flow diagram of another method for generating uplink control information (UCI)

FIG. 7 is a flow diagram of another method 700 for generating uplink control information (UCI) 228. The method 700 may be performed by a user equipment (UE) 104. The user equipment (UE) 104 may measure 702 downlink channels to obtain CQI/PMI/RI 141. The user equipment (UE) 104 may dynamically generate 704 an HARQ-ACK 140 based on the detection of a physical downlink shared channel (PDSCH) transmission.

The user equipment (UE) 104 may determine 706 whether a collision between the HARQ-ACK 140 and the CQI/PMI/RI 141 is detected. In one configuration, the user equipment (UE) 104 may use a collision detector 654 to determine 706 whether a collision between the HARQ-ACK 140 and the CQI/PMI/RI 141 is detected.

If a collision between the HARQ-ACK 140 and the CQI/PMI/RI 141 is detected, the user equipment (UE) 104 may determine 708 whether the simultaneousAckNackAndCQI parameter 116 is set to TRUE. As discussed above, the simultaneousAckNackAndCQI parameter 116 is signaled by higher layers 118 on the user equipment (UE) 104. If the simultaneousAckNackAndCQI parameter 116 is set to TRUE, the user equipment (UE) 104 may multiplex 710 the CQI/PMI/RI 141 and the HARQ-ACK 140 using physical uplink control channel (PUCCH) Format 3 to generate uplink control information (UCI) 228.

In step 710, Format 3 may not always be used for the HARQ-ACK 140. When the user equipment (UE) 104 detects a downlink assignment for only the physical downlink shared channel (PDSCH) 687 on the primary cell 685a, the user equipment (UE) 104 may use physical uplink control channel (PUCCH) Format 2/2a/2b and its resource for the HARQ-ACK 140.

When carrier aggregation is configured, the user equipment (UE) 104 may multiplex up to 11 bits for the CQI/PMI/RI 141 with up to 5 bits for the HARQ-ACK 140 on physical uplink control channel (PUCCH) Format 3 in a collision case where the CQI/PMI/RI 141 and the HARQ-ACK 140 are multiplexed. In cases where there is no collision or no multiplexing of the CQI/PMI/RI 141 and the HARQ-ACK 140, the user equipment (UE) 104 may be able to transmit up to 10 bits HARQ-ACK 140 on physical uplink control channel (PUCCH) Format 3. It may be desirable to limit the number of information bits to about 16 bits on Format 3, assuming a 1/3 encoding rate, because the number of coded bits is 48.

The up to 5 bits HARQ-ACK 140 may be generated by a spatial ACK/NACK bundling across multiple codewords for the HARQ-ACK 140 for each serving cell, because the number of serving cells that can be aggregated is up to 5. The user equipment (UE) 104 may apply this spatial ACK/NACK bundling if the HARQ-ACK 140 is more than 5 bits or X bits in the collision case where the CQI/PMI/RI 141 and the HARQ-ACK 140 are multiplexed. The user equipment (UE) 104 may apply this spatial ACK/NACK bundling if the total number of bits of the HARQ-ACK 140 and the CQI/PMI/RI 141 is more than 11 bits or 16 bits or X bits in the collision case where the CQI/PMI/RI 141 and the HARQ-ACK 140 are multiplexed. In one configuration, for simplification, the user equipment (UE) 104 may always apply the spatial ACK/NACK bundling in the collision case where the CQI/PMI/RI 141 and the HARQ-ACK 140 are multiplexed. Bundling refers to the use of an AND operation.

In Bundling, for a related HARQ-ACK 140, an ACK is generated in cases that all bits are ACK, otherwise a NACK is generated. These provide a benefit, as the number of information bits may be limited to about 16 bits on Format 3 to meet a sufficient performance requirement of the physical uplink control channel (PUCCH) 650. It is also better to not use ACK/NACK bundling across cells because each cell may have different channel conditions. Using Format 3 can avoid the use of additional bundling methods such as ACK/NACK bundling across cells and ACK/NACK bundling across multiple codewords.

In one configuration, the Format 3 on which both the HARQ-ACK 140 and the CQI/PMI/RI 141 are multiplexed may be referred to as Format 3a. In this case, Format 3 and Format 3a have a different encoding method but the same physical structure and use the same physical resource. Therefore, Format 3a is based on Format 3. Whether Format 2/2a/2b or Format 3/3a is used for multiplexing a CQI/PMI/RI 141 with an HARQ-ACK 140, the user equipment (UE) 104 may be configured with higher layer signaling.

If the simultaneousAckNackAndCQI parameter 240 is not set to TRUE, the user equipment (UE) 104 may drop 712 the CQI/PMI/RI 141. The user equipment (UE) 104 may then generate 714 uplink control information (UCI) 228 with the HARQ-ACK 140 using physical uplink control channel (PUCCH) Format 3. Format 3 is a new format for LTE-A. Format 3 is discussed in additional detail below in relation to FIG. 8 and FIG. 9.

In step 714, Format 3 may not always be used for the HARQ-ACK 140. When the user equipment (UE) 104 detects a downlink assignment only for the physical downlink shared channel (PDSCH) 687 on the primary cell 685a, the user equipment (UE) 104 may use physical uplink control channel (PUCCH) Format 1a/1b and the resources to fall back to Release 8/9 mode.

If a collision between the HARQ-ACK 140 and the CQI/PMI/RI 141 is not detected, the user equipment (UE) 104 may operate 716 the CQI/PMI/RI 141 or the HARQ-ACK 140 for the uplink control information (UCI) 228. In other words, when there is no collision, the user equipment (UE) 104 is required to transmit either the CQI/PMI/RI 141 or the HARQ-ACK 140. If the user equipment (UE) 104 is required to transmit the CQI/PMI/RI 141 for the uplink control information (UCI) 228, the user equipment (UE) 104 may generate 718 uplink control information (UCI) 228 with the CQI/PMI/RI 141 using physical uplink control channel (PUCCH) Format 2/2a/2b. If the user equipment (UE) 104 is required to transmit the HARQ-ACK 140 for the uplink control information (UCI) 228, the user equipment (UE) 104 may generate 714 uplink control information (UCI) 228 with the HARQ-ACK 140 using physical uplink control channel (PUCCH) Format 3.

The steps in FIG. 7 may be ordered other than as shown. For example, the measurement timing for step 702 is not defined. Thus, step 702 may occur after step 704. As another example, step 708 may occur before step 706.

Figure 8:
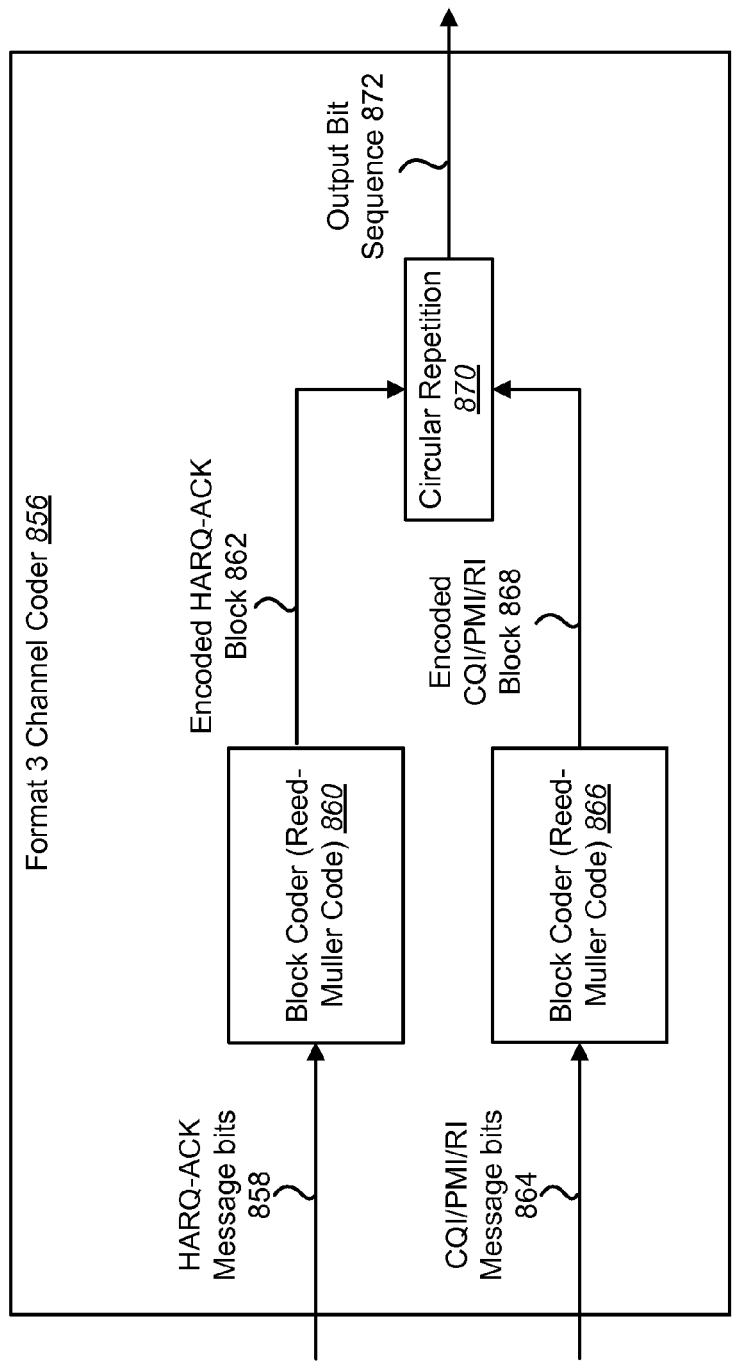
FIG. 8 is a block diagram of a Format 3 channel coder for the separate coding of HARQ-ACK message bits and CQI/PMI/RI message bits.

FIG. 8 is a block diagram of a Format 3 channel coder 856n for the separate coding of HARQ-ACK message bits 858 and CQI/PMI/RI message bits 864. A Format 3 channel coder 856 may also be able to perform joint coding of HARQ-ACK message bits 858 and CQI/PMI/RI message bits 864. The Format 3 channel coder 856 may generate uplink control information (UCI) 828 on a physical uplink control channel (PUCCH) symbol 824.

The Format 3 channel coder 856 may receive HARQ-ACK message bits 858. The HARQ-ACK message bits 858 may be denoted by $a_0^{ACK}$, $a_1^{ACK}$, $a_2^{ACK}$, $a_3^{ACK}$, ..., $a_{O_{ACK}-1}^{ACK}$, where $O_{ACK}$ is the number of bits $O_{ACK}$ (up to 10 bits in cases where there is no collision). The HARQ-ACK message bits 858 may be input to a block coder 860 that uses a (32, O) block code (Reed-Muller code). The code words of the (32, O) block code may be a linear combination of the 11 basis sequences denoted $M_{i,n}$ and defined in Table 1.

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 0 | 0 | 1 | 0 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 0 | 0 | 0 | 0 |
| 19 | 1 | 0 | 0 | 0 | 1 | 1 | 0 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The block coder 860 may output an encoded HARQ-ACK block 862 denoted by $b_0, b_1, b_2, b_3, \ldots, b_{B-1}$, where B=32 and $$b_i = \sum_{n=0}^{O_{ACK}-1} (a_n^{ACK} \cdot M_{i,n}) \bmod 2$$

where i=0, 1, 2, ..., B−1.

If the Format 3 channel coder 856 is being used to encode only HARQ-ACK message bits 858 (and not both HARQ-ACK message bits 858 and CQI/PMI/RI message bits 864), the output bit sequence 872 may be represented as $q_0, q_1, q_2, q_3, \ldots, q_{Q_{ACK}-1}$. The output bit sequence 872 of channel encoding may be obtained by circular repetition 870 of the encoded HARQ-ACK block 862: $q_i = b_{(i \bmod B)}$ where i=0, 1, 2, ..., $Q_{ACK}-1$. $Q_{ACK}$ is the total number of coded bits for the encoded HARQ-ACK block 862 (in this case $Q_{ACK}=48$).

If the Format 3 channel coder 856 is being used to encode both CQI/PMI/RI message bits 864 and HARQ-ACK message bits 858 (i.e., multiplexing the CQI/PMI/RI 141 and the HARQ-ACK 140), the Format 3 channel coder 856 may also receive CQI/PMI/RI message bits 864. The CQI/PMI/RI message bits 864 may be denoted by $a_0^{CQI}$, $a_1^{CQI}$, $a_2^{CQI}$, $a_3^{CQI}$, ..., $a_{O_{CQI}-1}^{CQI}$, where $O_{CQI}$ is the number of bits of CQI/PMI/RI 141. $O_{ACK}$ is up to 5 bits in cases where there is a collision. The CQI/PMI/RI message bits 864 may also be input to a (32, O) block coder 866 (Reed-Muller code) to obtain an encoded CQI/PMI/RI block 868 denoted by $b_0^{CQI}$, $b_1^{CQI}$, $b_2^{CQI}$, $b_3^{CQI}$, ..., $b_{B-1}^{CQI}$, where $$b_i^{CQI} = \sum_{n=0}^{O_{CQI}-1} (a_n^{CQI} \cdot M_{i,n}) \mod 2$$

with i=0, 1, 2, . . . , B−1 and where B=32. The encoded HARQ-ACK block 862 may be denoted by $b_0^{ACK}$, $b_1^{ACK}$, $b_2^{ACK}$, $b_3^{ACK}$, . . . , $b_{B-1}^{ACK}$, where $$b_i^{ACK} = \sum_{n=0}^{O_{ACK}-1} (a_n^{ACK} \cdot M_{i,n}) \mod 2$$

with i=0, 1, 2, . . . , B−1 and where B=32.

The output bit sequence 872 $q_0$, $q_1$, $q_2$, . . . , $q_{Q_{CQI}}$, $q_{Q_{CQI}+1}$, . . . , $q_{Q_{ACK}+Q_{CQI}-1}$ may be obtained by circular repetition 870 of the encoded HARQ-ACK block 862 and the encoded CQI/PMI/RI block 868 using Equation (1):

$$q_i = b_{(i \mod B)}^{CQI} \text{ where } i=0, 1, 2, \ldots, Q_{CQI}-1,$$

$$q_i = b_{((i-Q_{CQI}) \mod B)}^{ACK} \text{ where } i=Q_{CQI}, Q_{CQI}+1, Q_{CQI}+2, \ldots, Q_{CQI}+Q_{ACK}-1. \quad (1)$$

In Equation (1), $Q_{CQI}+Q_{ACK}$ is the total number of coded bits for the encoded HARQ-ACK block 862 and the encoded CQI/PMI/RI block 868. In this case, $Q_{CQI}$=32 and $Q_{ACK}$=16. Thus, $Q_{CQI}+Q_{ACK}$=48. This means that the encoded CQI/PMI/RI block 868 and the encoded HARQ-ACK block 862 are concatenated and the encoded HARQ-ACK block 862 is truncated into 16 bits. It is possible to use a (16, O) block code for the HARQ-ACK message bits 858.

The truncated 16 bits of the output of a (32, O) block code is the same code with the output of a (16, O) block code. In LTE, the user equipment (UE) 104 is already implemented to use a (32, O) block code (thus allowing the block code to be reused). The methods discussed above are for encoding the encoded CQI/PMI/RI block 868 and the encoded HARQ-ACK block 862 separately, allowing for a different encoding performance for each block.

In an alternate encoding method, the HARQ-ACK 140 and the CQI/PMI/RI 141 may be concatenated and jointly coded. The concatenated message bits may be denoted by $a_0^{ACK+CQI}$, $a_1^{ACK+CQI}$, . . . , $a_{O_{ACK}+O_{CQI}-1}^{ACK+CQI}$, which may be written as $a_0^{ACK}$, $a_1^{ACK}$, . . . , $a_{O_{ACK}-1}^{ACK}$, $a_0^{CQI}$, $a_1^{CQI}$, . . . , $a_{O_{CQI}-1}^{CQI}$. $O_{ACK}$ is up to 5 bits or $O_{ACK}+O_{CQI}$ is up to 16 bits in cases where there is collision. The HARQ-ACK 140 may be spatial bundled in the condition mentioned above. If $O_{ACK}+O_{CQI} \leq 11$, a (32, O) block code and circular repetition can be used like HARQ-ACK encoding when there is no collision. This means that $$b_i^{ACK+CQI} = \sum_{n=0}^{O_{ACK}+O_{CQI}-1} (a_n^{ACK+CQI} \cdot M_{i,n}) \mod 2$$

and $q_i^{ACK+CQI} = b_{(i \mod B)}^{ACK+CQI}$. If $O_{ACK}+O_{CQI} > 11$, a (48, O) block code and circular repetition can be used. If $O_{ACK}+O_{CQI} > 11$, a tail biting convolutional encoding can also be used. It is useful to use tail biting convolutional encoding in cases where there are a larger number of input bits.

By multiplexing the HARQ-ACK 140 and the CQI/PMI/RI 141, a user equipment (UE) 104 can provide both pieces of information to the eNode B 102. Basically, the HARQ-ACK 140 is more important than the CQI/PMI/RI 141 but the CQI/PMI/RI 141 is useful to adjust the physical downlink shared channel (PDSCH) transmission property. Thus, it is better for the user equipment (UE) 104 to inform the eNodeB 102 of both pieces of information.

Figure 9:
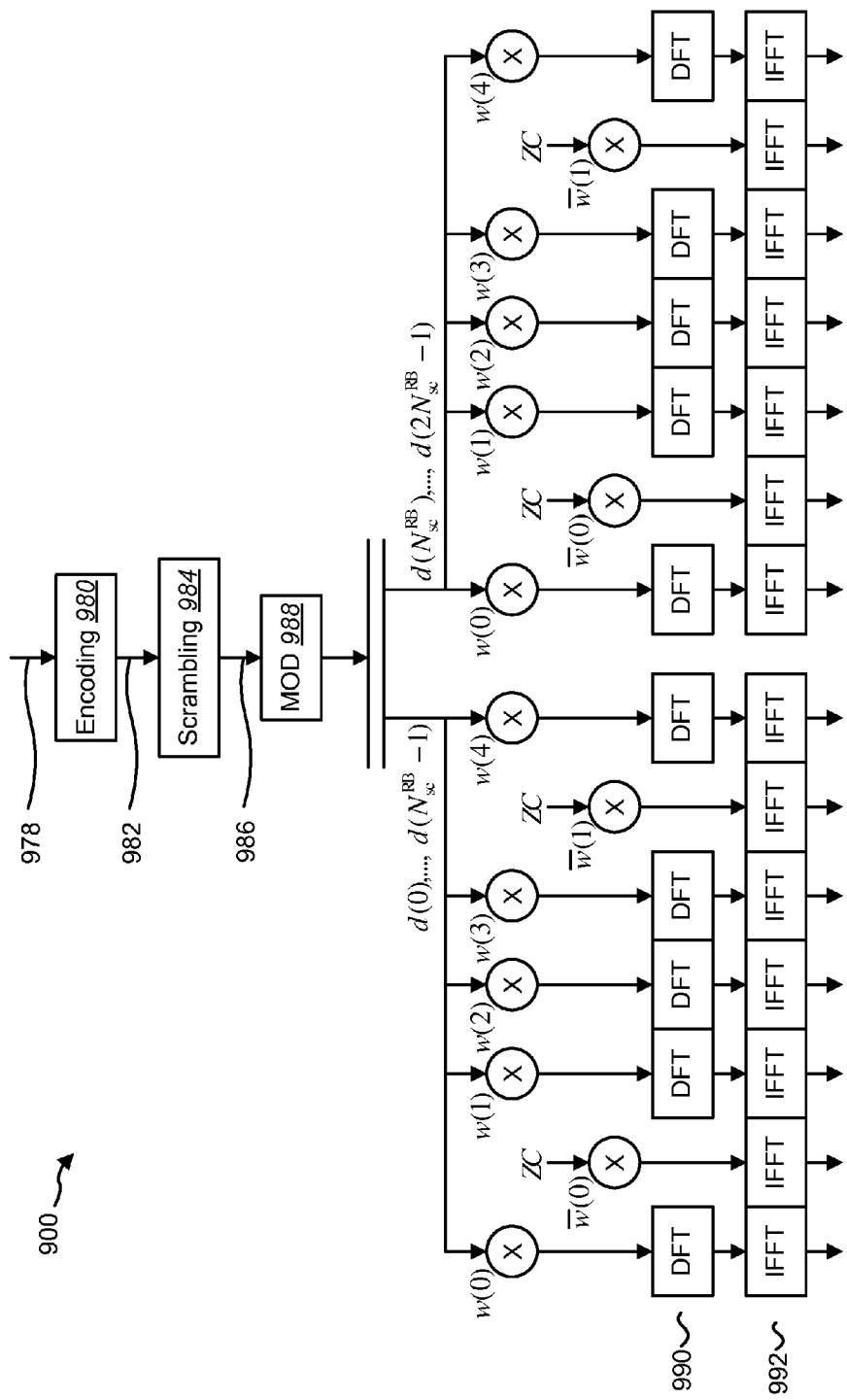
FIG. 9 is a block diagram illustrating a discrete Fourier Transform spread orthogonal frequency division multiplexing (DFT-S-OFDM) structure for Format 3.

FIG. 9 is a block diagram illustrating a discrete Fourier Transform spread orthogonal frequency division multiplexing (DFT-S-OFDM) structure 900 for Format 3. In Release 8/9, the maximum number of bits for the HARQ-ACK 140 is 2 bits for frequency division duplexing (FDD) using Format 1b or Format 2/2b and 4 bits for time division duplexing (TDD) using Format 1b with channel selection. Therefore, Format 3 is introduced for up to 10-bit HARQ-ACK 140 for FDD and 10 or more bit HARQ-ACK 140 for TDD. Format 3 is a new format for LTE-A that can carry 48 coded bits.

To generate the 48 coded bits, encoding 980 of an input signal 978 may be used. This encoding 980 is the Format 3 channel coder 856 and the input signal 978 is the uplink control information (UCI) 228. After channel encoding, scrambling 984 of the encoded signal 982 and quadrature phase shift keying (QPSK) modulation (MOD) 988 of the scrambled signal 986 may be used. After QPSK modulation 988, a block of complex-valued modulation symbols d(i) may be generated. $N_{sc}^{RB}$ is the number of subcarriers of one resource block. w(i) is an orthogonal sequence and ZC is a Zadoff-Chu sequence. A series of mixers, discrete Fourier Transforms (DFTs) 990 and inverse fast Fourier Transforms (IFFTs) 992 may be used.

For FDD, a user equipment (UE) 104 may determine the number of HARQ-ACK 140 bits based on the number of configured serving cells and the downlink transmission modes configured for each serving cell. A user equipment (UE) 104 may use two HARQ-ACK 140 bits for a serving cell configured with a downlink transmission mode that supports up to two transport blocks (codewords) and one HARQ-ACK 140 bit otherwise. A user equipment (UE) 104 that supports more than 4 ACK/NACK bits may be configured by higher layer signaling to use either physical uplink control channel (PUCCH) Format 1a/1b with channel selection or physical uplink control channel (PUCCH) Format 3 for transmission of the HARQ-ACK 140.

Even in Release 10, in case of a collision between a CQI/PMI/RI and an HARQ-ACK 140 in the same subframe, the CQI/PMI/RI 141 should be multiplexed with the HARQ-ACK 140 on the physical uplink control channel (PUCCH) 650. However, Release 8 only supports Format 2/2a/2b for that purpose, which can carry only 2 bits of the HARQ-ACK 140.

Figure 10:
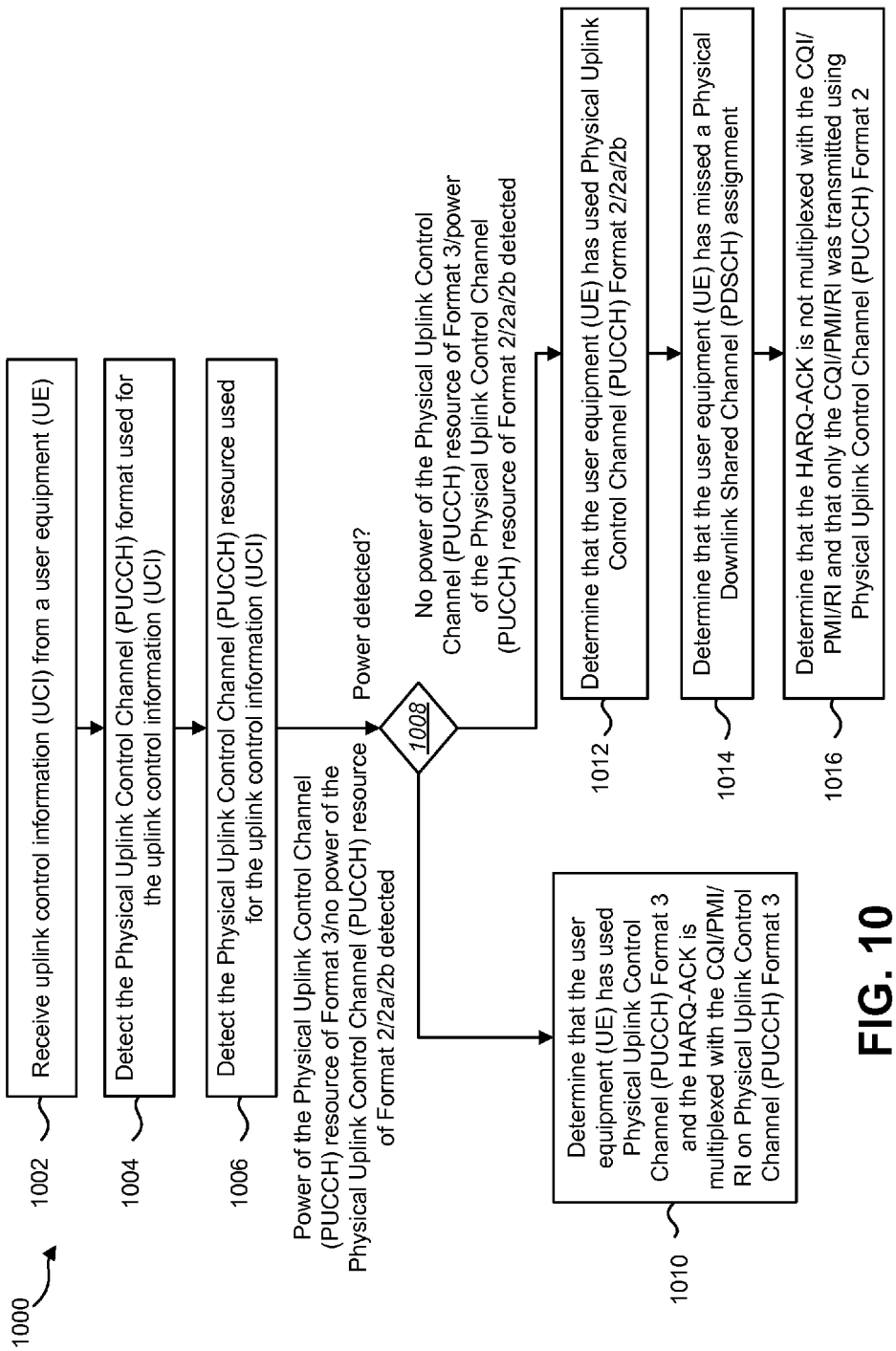
FIG. 10 is a flow diagram of a method for receiving uplink control information (UCI)

FIG. 10 is a flow diagram of a method 1000 for receiving uplink control information (UCI) 228. The method 1000 may be performed by an eNode B 102. The eNode B 102 may receive 1002 the uplink control information (UCI) 228 from a user equipment (UE) 104 via the physical uplink control channel (PUCCH) 450. The eNode B 102 may be unaware of whether the uplink control information (UCI) 228 was generated using physical uplink control channel (PUCCH) Format 3 or an older Format.

The eNode B 102 may know the subframe in which the CQI/PMI/RI is transmitted. However, the eNode B 102 may blindly detect 1004 the physical uplink control channel (PUCCH) Format used for the uplink control information (UCI) 228. The eNode B 102 may also blindly detect 1006 the physical uplink control channel (PUCCH) resource used for the uplink control information (UCI) 228. This is because the physical uplink control channel (PUCCH) Format and the physical uplink control channel (PUCCH) resource used depend on whether the user equipment (UE) 104 has missed the physical downlink shared channel (PDSCH) assignment or not. The eNode B 102 may then determine 1008 what power was detected.

If the eNode B 102 determines that the power of the physical uplink control channel (PUCCH) resource of Format 3 was detected and that no power of the physical uplink control channel (PUCCH) resource of Format 2/2a/2b was detected, the eNodeB 102 may determine 1010 that the user equipment (UE) 104 has used physical uplink control channel (PUCCH) Format 3 and that the HARQ-ACK 140 is multiplexed with the CQI/PMI/RI on physical uplink control channel (PUCCH) Format 3.

If the eNode B 102 determines that no power of the physical uplink control channel (PUCCH) resource of Format 3 was detected and that power of the physical uplink control channel (PUCCH) resource of Format 2/2a/2b was detected, the eNodeB 102 may determine 1012 that the user equipment (UE) 104 has used physical uplink control channel (PUCCH) Format 2/2a/2b. The eNode B 102 may also determine 1014 that the user equipment (UE) 104 has missed a physical downlink shared channel (PDSCH) assignment. The eNode B 102 may further determine 1016 that the HARQ-ACK 140 is not multiplexed with the CQI/PMI/RI and that only the CQI/PMI/RI was transmitted using physical uplink control channel (PUCCH) Format 2.

Unless otherwise noted, the use of '/' above represents the phrase "and/or".

Figure 11:
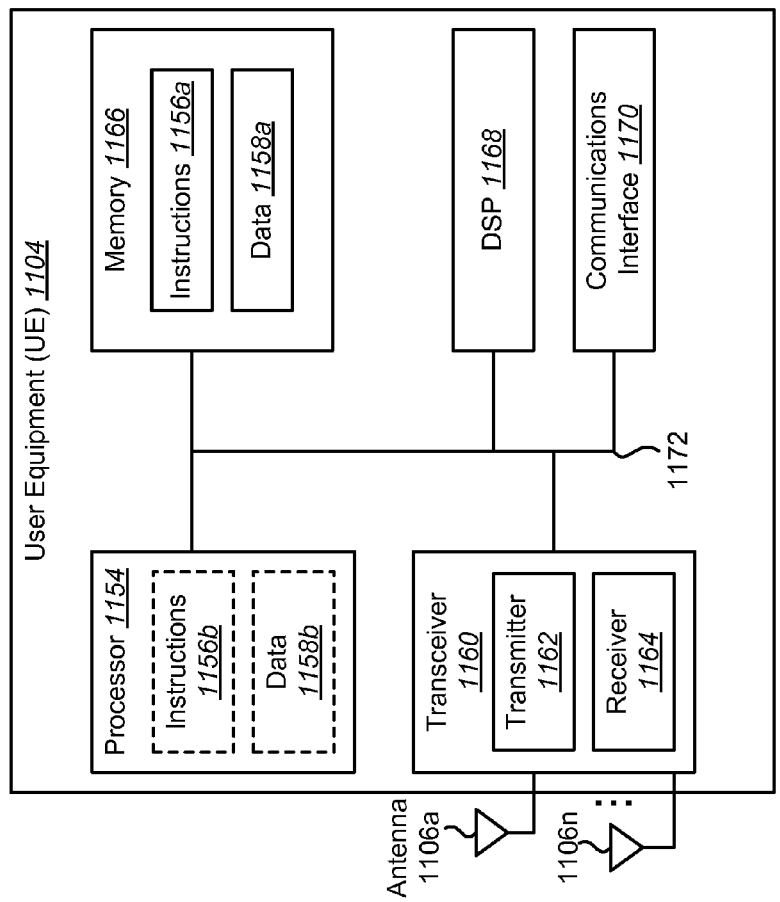
FIG. 11 illustrates various components that may be utilized in a User Equipment (UE)

FIG. 11 illustrates various components that may be utilized in a User Equipment (UE) 1104. The user equipment (UE) 1104 may be utilized as the user equipment (UE) 102 illustrated previously. The user equipment (UE) 1104 includes a processor 1154 that controls operation of the UE 1104. The processor 1154 may also be referred to as a CPU. Memory 1166, which may include both read-only memory (ROM), random access memory (RAM) or any type of device that may store information, provides instructions 1156a and data 1158a to the processor 1154. A portion of the memory 1166 may also include non-volatile random access memory (NVRAM). Instructions 1156b and data 1158b may also reside in the processor 1154. Instructions 1156b and/or data 1158b loaded into the processor 1154 may also include instructions 1156a and/or data 1158a from memory 1166 that were loaded for execution or processing by the processor 1154. The instructions 1156b may be executed by the processor 1154 to implement the systems and methods disclosed herein.

The user equipment (UE) 1104 may also include a housing that contains a transmitter 1162 and a receiver 1164 to allow transmission and reception of data. The transmitter 1162 and receiver 1164 may be combined into a transceiver 1160. One or more antennas 1106a-n are attached to the housing and electrically coupled to the transceiver 1160.

The various components of the user equipment (UE) 1104 are coupled together by a bus system 1172 which may include a power bus, a control signal bus, and a status signal bus, in addition to a data bus. However, for the sake of clarity, the various buses are illustrated in FIG. 11 as the bus system 1172. The user equipment (UE) 1104 may also include a digital signal processor (DSP) 1168 for use in processing signals. The user equipment (UE) 1104 may also include a communications interface 1170 that provides user access to the functions of the user equipment (UE) 1104. The user equipment (UE) 1104 illustrated in FIG. 11 is a functional block diagram rather than a listing of specific components.

Figure 12:
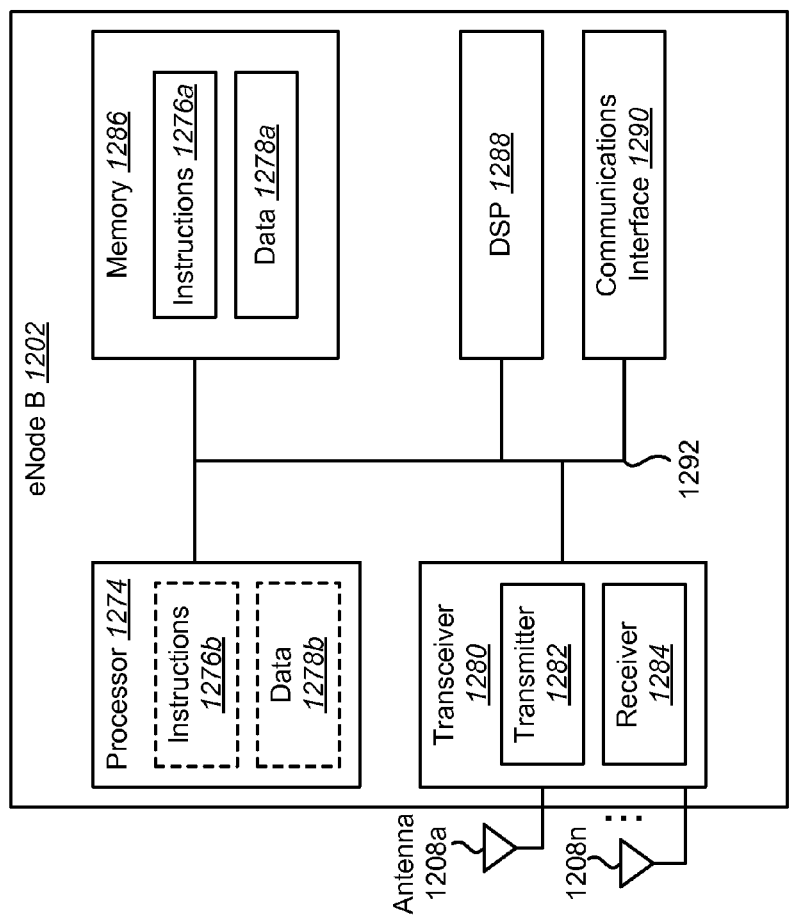
FIG. 12 illustrates various components that may be utilized in an eNode B.

FIG. 12 illustrates various components that may be utilized in an eNode B 1202. The eNode B 1202 may be utilized as the eNode B 102 illustrated previously. The eNode B 1202 may include components that are similar to the components discussed above in relation to the user equipment (UE) 1104, including a processor 1274, memory 1286 that provides instructions 1276a and data 1278a to the processor 1274, instructions 1276b and data 1278b that may reside in or be loaded into the processor 1274, a housing that contains a transmitter 1282 and a receiver 1284 (which may be combined into a transceiver 1280), one or more antennas 1208a-n electrically coupled to the transceiver 1280, a bus system 1292, a DSP 1288 for use in processing signals, a communications interface 1290 and so forth.

Unless otherwise noted, the use of '/' above represents the phrase "and/or".

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reporting uplink control information (UCI) on a user equipment (UE), comprising:
    coding the UCI using a first block coder and a second block coder to obtain an output bit sequence;
    scrambling the output bit sequence to obtain a scrambled signal;
    generating a block of complex-valued modulation symbols from the scrambled signal for physical uplink control channel (PUCCH) Format 3; wherein the first block coder and the second block coder use a Reed-Muller code; and
    in a case of a collision between a hybrid automatic repeat request acknowledgment (HARQ-ACK) and a channel quality indicator/precoding matrix index/rank indication (CQI/PMI/RI) in a same subframe, and in a case that a simultaneousAckNackAndCQI parameter is set to TRUE and a downlink assignment only for a physical downlink shared channel (PDSCH) on a primary cell is detected,
    transmitting a HARQ-ACK and a CQI/PMI/RI on a PUCCH Format 2/2a/2b.

2. A user equipment (UE) configured for reporting uplink control information (UCI), comprising:
    a processor;
    memory in electronic communication with the processor;
    instructions stored in the memory, the instructions being executable to:
    code the UCI using a first block coder and a second block coder to obtain an output bit sequence;
    scramble the output bit sequence to obtain a scrambled signal;
    generate a block of complex-valued modulation symbols from the scrambled signal for physical uplink control channel (PUCCH) Format 3, wherein the first block coder and the second block coder use a Reed-Muller code; and
    in a case of a collision between a hybrid automatic repeat request acknowledgment (HARQ-ACK) and a channel quality indicator/precoding matrix index/rank indication (CQI/PMI/RI) in a same subframe, and in a case that a simultaneousAckNackAndCQI parameter is set to TRUE and a downlink assignment only for a physical downlink shared channel (PDSCH) on a primary cell is detected,
    transmitting a HARQ-ACK and a CQI/PMI/RI on a PUCCH Format 2/2a/2b.

3. A method for receiving uplink control information (UCI) on an evolved Node B (eNB), comprising:
    receiving the UCI using physical uplink control channel (PUCCH) Format 3, wherein the UCI is coded using a first block coder and a second block coder to obtain an output bit sequence, wherein the output bit sequence is scrambled to obtain a scrambled signal, wherein a block of complex-valued modulation symbols are generated from the scrambled signal for PUCCH Format 3, wherein the first block coder and the second block coder use a Reed-Muller code, wherein in a case of a collision between a hybrid automatic repeat request acknowledgment (HARQ-ACK) and a channel quality indicator/precoding matrix index/rank indication (CQI/PMI/RI) in a same subframe, and in a case that a simultaneousAckNackAndCQI parameter is set to TRUE and a downlink assignment only for a physical downlink shared channel (PDSCH) on a primary cell is detected,
    a HARQ-ACK and a CQI/PMI/RI are received on a PUCCH Format 2/2a/2b.

4. An evolved Node B (eNB) configured for receiving uplink control information (UCI), comprising:
    a processor;
    memory in electronic communication with the processor;
    instructions stored in the memory, the instructions being executable to:
    receive the UCI using physical uplink control channel (PUCCH) Format 3,
    wherein the UCI is coded using a first block coder and a second block coder to obtain an output bit sequence, wherein the output bit sequence is scrambled to obtain a scrambled signal, wherein a block of complex-valued modulation symbols are generated from the scrambled signal for PUCCH Format 3, wherein the first block coder and the second block coder use a Reed-Muller code, wherein in a case of a collision between a hybrid automatic repeat request acknowledgment (HARQ-ACK) and a channel quality indicator/precoding matrix index/rank indication (CQI/PMI/RI) in a same subframe, and in a case that a simultaneousAckNackAndCQI parameter is set to TRUE and a downlink assignment only for a physical downlink shared channel (PDSCH) on a primary cell is detected,
    a HARQ-ACK and a CQI/PMI/RI are received on a PUCCH Format 2/2a/2b.

* * * * *